R. H. BEAUMONT.
ROLL CRUSHER.
APPLICATION FILED JUNE 17, 1915.
1,153,016.
Patented Sept. 7, 1915.
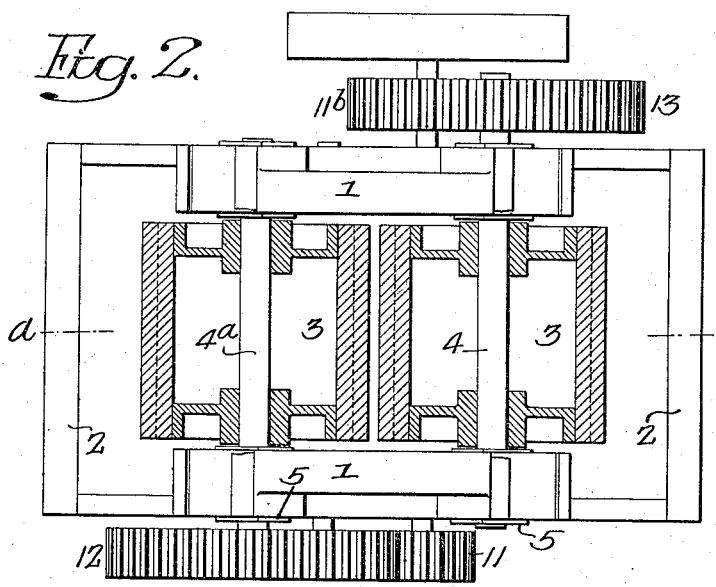
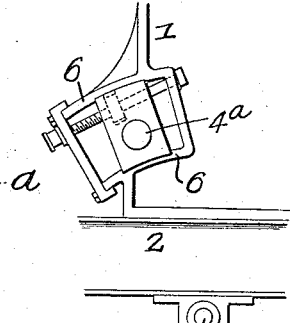
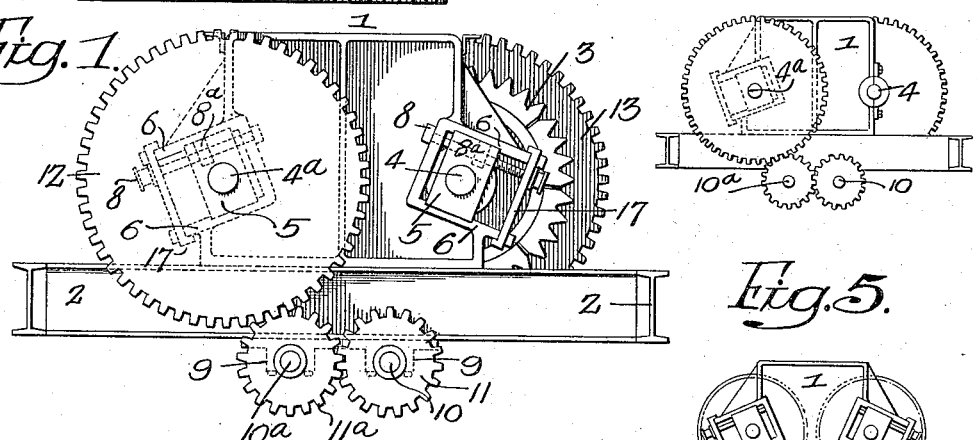
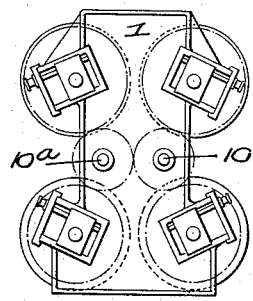
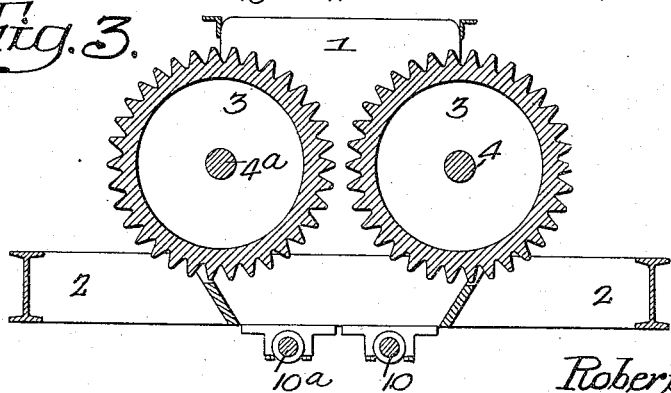
Inventor:-
Robert H. Beaumont.
by his Attorneys

UNITED STATES PATENT OFFICE.

ROBERT H. BEAUMONT, OF PHILADELPHIA, PENNSYLVANIA.

ROLL-CRUSHER.

1,153,016.  Specification of Letters Patent.  Patented Sept. 7, 1915.

Application filed June 17, 1915. Serial No. 34,729.

*To all whom it may concern:*

Be it known that I, ROBERT H. BEAUMONT, a citizen of the United States, residing in Philadelphia, Pennsylvania, have invented certain Improvements in Roll-Crushers, of which the following is a specification.

The object of my invention is to construct crushing rolls so that the rolls can be adjusted toward and from each other without interfering with the driving gears. This object I attain in the following manner, reference being had to the accompanying drawings, in which:

Figure 1 is a side view of my improved crushing rolls; Fig. 2 is a plan view with the rolls in section; Fig. 3 is a sectional elevation on the line $a$—$a$, Fig. 2; and Figs. 4, 5, and 6 are views of modifications.

Referring to the drawings, 1, 1 are two housings which are mounted on a quadrangular frame 2 made, in the present instance, of I-beams. The housings are spaced apart to accommodate the crushing rolls 3, which are ribbed as shown in Fig. 3. These teeth may be formed in any desired manner and the toothed surface of the rolls may be made in sections or the rolls may be made as a single unit. One roll is mounted on a shaft 4 and the other roll is mounted on the shaft $4^a$. These shafts are adapted to boxes 5 adjustably mounted on ways 6 in the housings 1. The openings in the housings for the boxes are closed by caps 17. Each box is adjusted by a screw 8, which passes through a nut $8^a$, loosely confined to the box.

Mounted in bearings 9 secured to the underside of the frame 2, in the present instance, are shafts 10 and $10^a$ geared together by pinions 11 and $11^a$ so that they will turn in unison in opposite directions. The pinion $11^a$ meshes with the gear wheel 12 on the shaft $4^a$ and a pinion $11^b$, on the shaft 10 at the opposite side of the machine, meshes with a gear wheel 13 on the shaft 4. By this construction the two rolls 3 turn in opposite directions, the center portion of the housings acting as lateral guides for the material as it passes between the rolls.

By gearing the rolls in the manner above described, I can arrange the ways 6 for the boxes 5 at right angles to a line drawn through the shafts 10 and 4, and $10^a$ and $4^a$ and considerable adjustment can be had without changing the relation of the gearing.

While I have shown the ways straight, as in Fig. 1, they may be arranged on a radius taken from the center of the shafts 10 and $10^a$, as shown in Fig. 6.

While I have shown the rolls driven through gear wheels, drive chains may be substituted therefor.

Though I have shown two driving shafts geared to the two roll shafts, in some instances the construction illustrated in Fig. 4 may be used where one roll shaft is mounted in fixed bearings and the other roll shaft is mounted in an adjustable bearing and this latter roll shaft is driven from a driving shaft, which may be geared to the stationary roll shaft in any manner desired.

In Fig. 5, I have shown two sets of rolls, arranged according to my invention, the rolls being driven from the intermediate shafts and the boxes being arranged so that the rolls can be adjusted without disturbing the gears.

I claim:

1. The combination in a roll crusher, of housings having shafts on which the rolls are mounted; boxes carrying the shafts; the boxes for one shaft being adjustable; a driving shaft for the adjustable roll shaft; gearing on the driving shaft and on the roll shaft by which the roll shaft is driven, the boxes for the adjustable shaft being adjustable on a line substantially at right angles to a radial line taken through the center of the driving shaft and the roll shaft.

2. The combination in a roll crusher, of housings; two rolls; shafts on which the rolls are mounted; bearings on the shafts adjustable in the housings; a driving shaft for each roll shaft, the roll shafts being adjustable on a line substantially at right angles to the radial line through the driving shafts and the roll shafts.

3. The combination in a roll crusher, of housings; two driving shafts spaced apart and geared together so as to turn in opposite directions; two rolls mounted between the housings; shafts on which the rolls are mounted; housings having guideways; boxes mounted in the guideways to which the roll shafts are adapted; means for adjusting the boxes; a gear wheel on each roll shaft; a pinion on one of said driving shafts which meshes with the gear wheel on one roll shaft; a pinion on the other driving shaft which meshes with the gear wheel on the other roll shaft, the guideways having such relation to the driving shafts that they can be adjusted without materially changing the relation of the driving gears.

ROBERT H. BEAUMONT.

Copies of this patent may be obtained for five cents each, by addressing the "Commissioner of Patents. Washington, D. C."